L. W. THOMPSON.
REGULATING SYSTEM FOR ALTERNATING CURRENT CIRCUITS.
APPLICATION FILED JULY 10, 1918.
1,337,854. Patented Apr. 20, 1920.
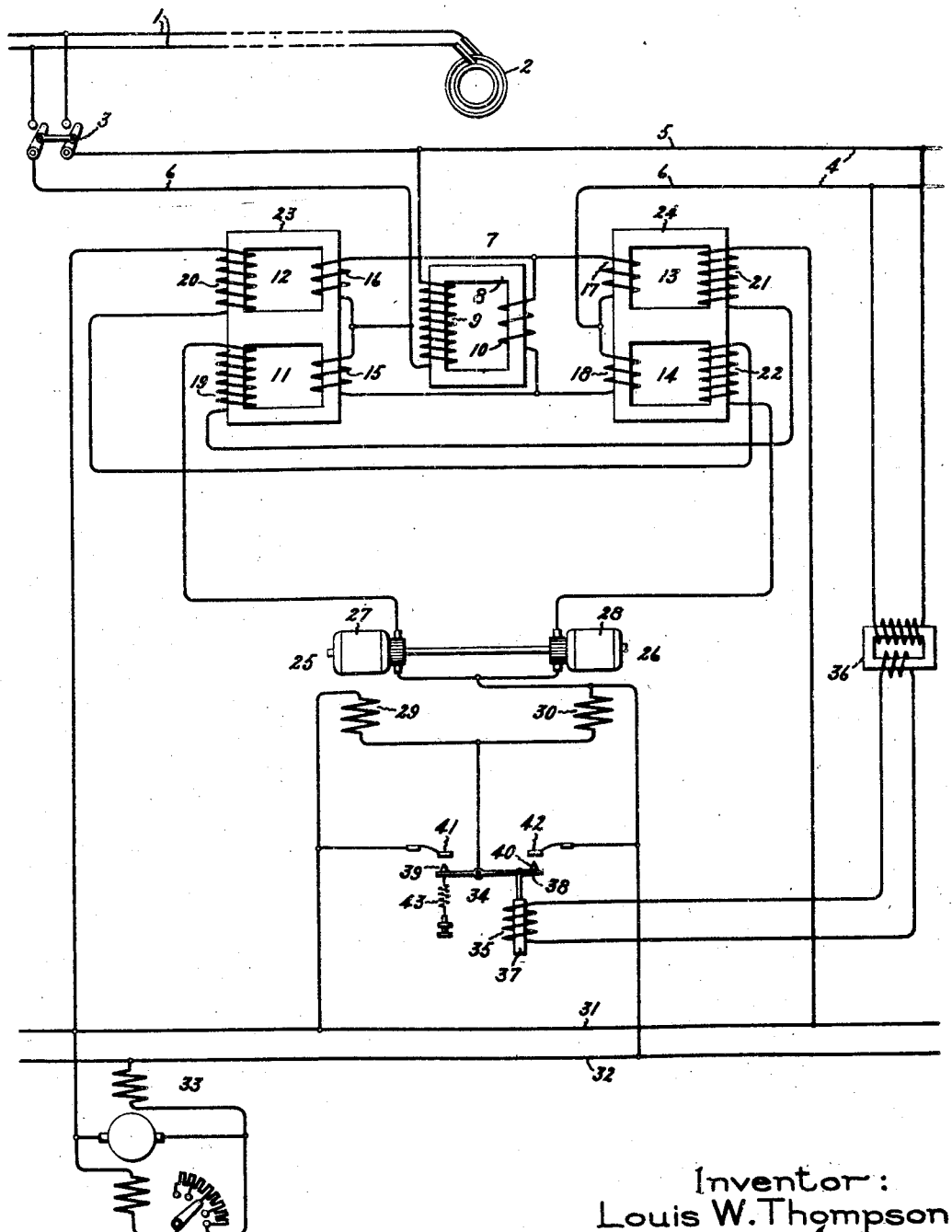
Inventor:
Louis W. Thompson,
by *[signature]*
His Attorney.

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATING SYSTEM FOR ALTERNATING-CURRENT CIRCUITS.

1,337,854.            Specification of Letters Patent.         Patented Apr. 20, 1920.

Application filed July 10, 1918. Serial No. 244,170.

*To all whom it may concern:*

Be it known that I, LOUIS W. THOMPSON, a citizen of the United States, residing at Schenectady, in the county of Schenectady, State of New York, have invented certain new and useful Improvements in Regulating Systems for Alternating-Current Circuits, of which the following is a specification.

My invention relates to regulating systems for alternating current circuits and has for its main object the provision of a new and improved system whereby regulation of an alternating current circuit may be accomplished without the interruption of power currents and without the use of heavy moving parts, and whereby quick and sensitive regulation may be obtained.

In accordance with my invention I propose to regulate an electrical condition, such as the voltage, of an alternating current circuit by the use of a transformer having an inducing winding and an induced winding and means comprising reactors for causing the electromotive forces developed in said induced winding to boost or buck the voltage of said circuit. In the embodiment of my invention which is illustrated in the accompanying drawings and is hereinafter particularly described, I divide one side of the alternating current circuit, an electrical condition of which is to be regulated, into two branches, insert in each branch a pair of reactors, connect the induced winding of a transformer between the branches intermediate of the reactors, and cause the electromotive forces developed in said induced winding to boost or buck the voltage of said circuit by varying the relative values of the inductances of the reactors. The inductances of the reactors are preferably varied by producing in the cores thereof unidirectional fluxes, hereinafter referred to as magnetizing fluxes. While it is preferable to regulate the inductances of the reactors by developing in the cores thereof regulatable unidirectional flux, nevertheless the variation of the inductances of the reactors may in a measure be accomplished by developing in the cores thereof regulatable alternating flux having a lower frequency than the frequency of the alternating current circuit to be regulated. Since unidirectional flux and unidirectional current may be properly considered as flux and current of zero frequency, the expression "flux having a lower frequency than the frequency of said circuit" as used herein is intended to include a unidirectional flux as well as an alternating flux, while the expression "current having a lower frequency than the frequency of said circuit" is intended to include unidirectional current as well as alternating current.

My invention may best be understood by reference to the following description considered in connection with the accompanying drawings, while the scope of my invention is defined in the appended claims.

Referring to the accompanying drawings consisting of a single figure; in which is diagrammatically shown one modification of my invention as applied to the regulation of a single phase alternating current circuit, 1 denotes an alternating current supply circuit, which is energized from a single phase source of current 2 and may be connected, by means of the switch 3, to the alternating current consumption circuit 4 comprising the mains 5 and 6. 7 denotes a transformer comprising a core 8, a primary, or inducing winding 9, connected between the mains 5 and 6, and a secondary, or induced, winding 10. 11, 12, 13 and 14 denote reactors having windings 15, 16, 17 and 18, which are adapted to be traversed by power current consumed in the alternating current consumption circuit, and magnetizing windings 19, 20, 21 and 22. As illustrated, the windings of the reactors 11 and 12 are arranged upon a single core structure 23 and the windings of the reactors 13 and 14 are arranged upon a single core structure 24. The reactors have separate magnetic circuits, however, and, if desired, the windings of the several reactors may be arranged upon separate cores. The main 6 is divided into two branches, one of which includes the windings 15 and 18 of the reactors 11 and 14 and the other of which includes the windings 16 and 17 of the reactors 12 and 13. The secondary winding 10 of the transformer 7 is connected between the branches intermediate of the windings 15 and 18 and the windings 16 and 17. 25 and 26 denote counter electromotive force machines comprising armatures 27 and 28, which are preferably mounted upon a common shaft, and field windings 29 and 30. The magnetizing windings 19 and 21 of the reactors 11 and 13 are connected in series with the armature 27 across the buses 31 and 32 which may be supplied with direct current from the generator 33 or any other suitable source. Similarly the magnetizing windings 20 and 22 of the reactors 12 and 14 are connected in series with the armature 28 across the buses 31 and 32. 34 denotes a vibratory device comprising a winding 35 connected, by means of a potential transformer 36, to the consumption circuit 4 and a core 37 actuated by said winding 35, a movable arm 38 pivotally connected to said core, contacts 39 and 40 carried by said arm, and resiliently mounted stationary contacts 41 and 42 coöperating with the contacts 39 and 40. The windings 29 and 30 of the counter electromotive force machines 25 and 26 are connected in series between the buses 31 and 32. The contacts 39 and 40 of the vibratory device 34 are connected by means of the movable arm 38 to a point intermediate the field windings 29 and 30. Contacts 41 and 42 of the vibratory device 24 are connected to the buses 31 and 32, respectively. An adjustable spring 43 is associated with the movable arm 38. The vibratory device 34 may be adjusted by means of the adjustable spring 43 so that, upon the voltage of the alternating current circuit 4 increasing above the desired predetermined value, the core 37 will be raised thereby engaging contacts 40 and 42 and disengaging contacts 39 and 41 and, upon the voltage of the circuit 4 decreasing below said desired predetermined value, the core 37 will be lowered, thereby disengaging contacts 40 and 42 and engaging contacts 39 and 40.

The operation of my invention as at present understood, is as follows:

Assume the circuit 1 to be energized, the switch 3 to be closed, and the direct current buses 31 and 32 to be energized from the generator 33. First supposing the voltage of the circuit 4 to be above the desired predetermined value, the core 37 will be in its upper position so that the contacts 39 and 41 will be disengaged and the contacts 40 and 42 will be engaged. The field winding 29 of the counter electromotive force machine 25 will then be energized and the field winding 30 of the counter electromotive force machine 26 will be deënergized since it will be short circuited at the contacts 40 and 42. The counter electromotive force machine 25 will, therefore, operate as a motor and both armatures 27 and 28 will be rotated. In the armature 27 there will be developed a counter electromotive force which will limit the current in the magnetizing windings 19 and 21 of the reactors 11 and 13 to a relatively low value, while in the armature 28 there will be developed very little, if any, counter electromotive force so that the current in the magnetizing windings 20 and 22 of the reactors 12 and 14 will have a relatively high value. Under these conditions the voltage induced in the secondary winding 10 of the transformer 7 will buck the voltage in the circuit 4. Now supposing the voltage of the consumption circuit to be below the desired predetermined value, the core 37 will be in its lower position so that the contacts 39 and 41 will be engaged and the contacts 40 and 42 will be disengaged. The field winding 29 will then be short circuited by contacts 39 and 41, and hence be deënergized, and the field winding 30 will be energized. The counter electromotive force machine 26 will, therefore, operate as a motor and both armatures 27 and 28 will be rotated. In the armature 27 there will be developed very little, if any, counter electromotive force so that the current in the magnetizing windings 19 and 21 of the reactors 11 and 13 will have a relatively high value, while in the armature 28 there will be developed a counter electromotive force which will limit the current in the magnetizing windings 20 and 22 of the reactors 12 and 14 to a relatively low value. Under these conditions the electromotive forces induced in the secondary winding 10 of the transformer 7 will boost the voltage in the circuit 4. Although the operation during only one vibration of the vibratory device 34 has been described, it will be understood that the vibratory device 34 is normally in rapid vibration and, by controlling the relative degree to which the field windings 29 and 30 are energized and thereby controlling the relative values of the counter electromotive forces interposed by the armatures 27 and 28 in the circuits of the magnetizing windings 19—21 and 20—22, the vibratory device 34 regulates the bucking or boosting effect of the transformer 7 in such a manner as to maintain a substantially constant voltage on the consumption circuit 4. By the use of counter electromotive machines which are interposed between the vibratory device 34 and the magnetizing windings of the reactors, sensitive and quick regulation is secured without producing objectionable fluctuations in the voltage of the circuit 4 due to the operation of the vibratory device 34. It is conceived, however, that other means than those shown may be employed in combination with a vibratory device to regulate the energization of the magnetizing windings without the production of objectionable fluctuations in the voltage of the regulated circuit due to the operation of the vibratory device.

Although my invention is illustrated as applied to a single phase alternating current circuit, it will be apparent to those skilled in the art how it may be applied to polyphase alternating current circuits.

While I have herein shown and described one embodiment of my invention, I do not desire to be limited to the exact arrangement shown and described but seek to cover in the appended claims all those embodiments and modifications which come within the true spirit and scope of my invention.

What I claim as new and desire to secure by letters Patent of the United States, is:

1. The combination with an alternating current circuit of a transformer having an inducing winding and an induced winding, reactors for connecting one of said windings to said circuit, and means for varying the inductances of said reactors to cause the electromotive forces developed in said induced winding to boost or buck the voltage of said circuit.

2. The combination with an alternating current circuit of a transformer having an inducing winding and an induced winding, reactors for connecting said induced winding to said circuit, means for varying the inductances of said reactors to cause the electromotive forces developed in said induced winding to boost or buck the voltage of said circuit.

3. The combination with an alternating current circuit of a transformer having an inducing winding and an induced winding, reactors for connecting one of said windings to said circuit, means responsive to an electrical condition of said circuit for varying the inductances of said reactors to cause the electromotive forces developed in said induced winding to boost or buck the voltage of said circuit.

4. The combination with an alternating current circuit of a transformer having an inducing winding and an induced winding and means for causing the electromotive forces developed in said induced winding to boost or buck the voltage of said circuit comprising magnetic core reactors for connecting one of said windings to said circuit, means for developing in said reactors magnetic fluxes having lower frequencies than the frequency of said circuit and means for varying said fluxes.

5. The combination with an alternating current circuit of a transformer having an inducing winding and an induced winding, said circuit comprising branches between which one of said windings is connected, magnetic core reactors having windings in said branches, means for developing in said reactors fluxes having lower frequencies than the frequency of said circuit, and means for varying the magnetizing fluxes in certain of said reactors to cause the electromotive forces developed in said induced winding to boost or buck the voltage of said circuit.

6. The combination with an alternating current circuit of a transformer having an inducing winding and an induced winding, said circuit comprising two parallel branches between which said induced winding is connected, magnetic core reactors having windings in said branches, means for developing in said reactors fluxes having lower frequencies than the frequency of said circuit, and means responsive to an electrical condition of said circuit for varying said fluxes to cause the electromotive forces developed in said induced winding to boost or buck the voltage of said circuit.

7. The combination with an alternating current circuit of a transformer having an inducing winding and an induced winding, said circuit comprising two parallel branches, a pair of magnetic core reactors for each branch having windings connected therein, said induced winding being connected between said branches intermediate said reactor windings, means for developing in said reactors fluxes having lower frequencies than the frequency of said circuit, and means responsive to an electrical condition of said circuit for varying said fluxes to cause the electromotive forces developed in said induced winding to boost or buck the voltage of said circuit and to vary the amount of boost or buck.

8. The combination with an alternating current circuit of a transformer having an inducing winding and an induced winding and means for causing the electromotive forces developed in said induced winding to boost or buck the voltage of said circuit, comprising reactors provided with windings for connecting said induced winding to said circuit, magnetizing windings and magnetic cores, means for supplying currents of lower frequency than the frequency of said circuit to said magnetizing windings, vibratory means responsive to an electrical condition of said circuit for varying said currents, and means for preventing abrupt variations in said currents due to the action of said vibratory means.

9. The combination with an alternating current circuit of a transformer having an inducing winding and an induced winding, said circuit comprising branches between which said induced winding is connected, reactors provided with windings connected in said branches, magnetizing windings and magnetic cores, means for supplying direct currents to said magnetizing windings, counter electromotive force means for controlling the currents in said magnetizing windings, and means responsive to an electrical condition of said circuit for varying the counter electromotive forces developed by said counter electromotive force means.

10. The combination with an alternating current circuit of a transformer having an inducing winding and an induced winding, said circuit comprising two parallel branches, a pair of reactors for each branch provided with windings connected therein, magnetizing windings and magnetic cores, said induced winding being connected between said branches intermediate the reactor windings connected therein, means for supplying direct currents to said magnetizing windings, electromotive force machines having armature windings connected in series with said magnetizing windings and field windings, and a vibratory device responsive to an electrical condition of said circuit for varying the relative energization of said field windings.

In witness whereof, I have hereunto set my hand this 8th day of July, 1918.

LOUIS W. THOMPSON.